July 22, 1941.  C. WALLACE, JR  2,250,318

CAKE OF SOAP

Filed Feb. 23, 1940

INVENTOR
Charlton Wallace Jr.
BY
Henry G. Dybvig
ATTORNEY

Patented July 22, 1941

2,250,318

UNITED STATES PATENT OFFICE 2,250,318

CAKE OF SOAP

Charlton Wallace, Jr., Cincinnati, Ohio

Application February 23, 1940, Serial No. 320,466

2 Claims. (Cl. 252—134)

This invention relates to a cake or bar of soap and more particularly to a cake of soap that is provided with a roughened or undulated surface for agitating and massaging the surface to be cleaned.

In the past, cakes of soap have generally been provided with a smooth work engaging surface, excepting for ornamental effect found in the extreme outer surface of the cake. Some types of soap have been provided with shallow marginal ribs or grooves, functioning as hand engaging surfaces, to facilitate the manipulation of the cake of soap. Furthermore, grooves have been used to expedite the drying of the molded cake. Such grooves may also be used as trade-marks to identify the maker. All of these ribs and grooves are superficial.

An object of this invention is to provide a cake of soap having bumps adapted to engage the surface coming in contact with the cake of soap, which bumps have a washboard or scrubbing action upon the work to be washed.

Another object of this invention is to provide a cake of soap with ribs for massaging the surface.

Another object of this invention is to provide a cake of soap that is provided with ribs overlying grooves in the opposite side thereof.

Another object of this invention is to provide a cake of soap that has been provided with work engaging corrugations.

Another object of this invention is to provide suction pockets in the cake of soap.

Other objects and advantages reside in the construction of parts, the combination thereof and the mode of operation, as will become more apparent from the following description.

In the drawing, Figure 1 shows a perspective view of the preferred embodiment of a cake of soap.

Cakes of soap are generally provided with a smooth work engaging surface. This proves satisfactory for some usage of the soap. Other cakes of soap have been provided with shallow ribs or grooves for the purpose of ornamentation or for the purpose of providing a hand grip engaging surface.

In washing clothing and the like, the article to be washed is brought into contact with a rough or ridged surface for accelerating the washing operation. This may be in the form of a washboard or ribs in a washing machine and the like. In other cases, it may partake the nature of a vacuum cup or a suction cup, tending to force the cleansing liquid or fluid through the material.

In the present embodiment a cake of soap has been provided with ribs on either side of valleys or depressions, the ribs on one side of the cake being disposed opposite the depressions on the opposite side, so that the maximum thickness of the material underlying a rib is located substantially on one side of a neutral plane of the cake of soap. Thus, when the soap is utilized, the ribs will not be completely worn down until the cake of soap has been spent.

The elevations on the cake of soap may be in the form of parallel ribs overlying parallel grooves, or they may be in the form of annular or circular ribs overlying circular grooves, or they may consist of substantially cup-shaped bumps overlying depressions. The ribs and the valleys between the ribs function much the same as a washboard does when the cake of soap is rubbed over the material or the surface to be cleaned. When the cake of soap is provided with annular ribs or depressions, the grooves and ribs function similar to vacuum cups in creating a suction, expediting the washing of the surface to be cleansed.

Figure 1:
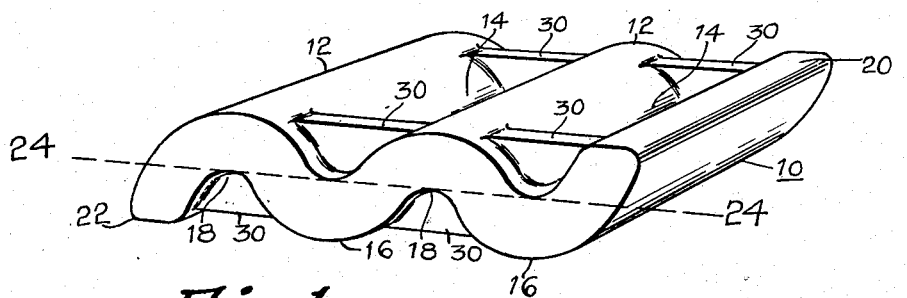

Referring to the drawing, the reference numeral 10 indicates a cake of corrugated soap, provided with parallel ribs 12 and grooves 14. Ribs 16, located on the opposite side of the cake, are staggered with respect to the ribs 12 and underlie the grooves 14. Grooves 18 are located between the ribs 16 and positioned opposite the ribs 12. The number of ribs and the number of grooves in each cake of soap is a matter of choice. In the modification disclosed in Figure 1, there are two full ribs and two full grooves on either side and a flange 20 on the top and a flange 22 on the bottom.

The ribs cooperate with the grooves to form a washboard effect, so that as the cake is rubbed over the surface to be washed, the ribs will agitate and massage the surface, thereby expediting the washing operation. It is to be noted that the depth of the cake of soap is substantially uniform throughout. In other words, the bottoms of the grooves on opposite sides are located in a common plane indicated by the dotted line 24—24, which will be referred to as a neutral plane. By this arrangement, the ribs will not be completely worn off as long as any of the soap remains. The ribs will last for the life of the cake of soap. The cake of soap simulates a sheet of soap that has been corrugated.

In order to reenforce the cake, so as to give it rigidity, and in order to create closed recesses or pockets for creating a vacuum, transverse flanges 30 span the distance from rib to rib. There may be one flange adjacent each end on both sides. These flanges give the cake rigidity and at the same time create pockets between the flanges functioning as vacuum cups. If the soap material is rigid and does not flex or bend, the flanges 30 may be eliminated. Of course, the elimination of the flanges in the embodiment disclosed in Figure 1, eliminates the suction cups formed by the grooves between the flanges.

Figure 2:
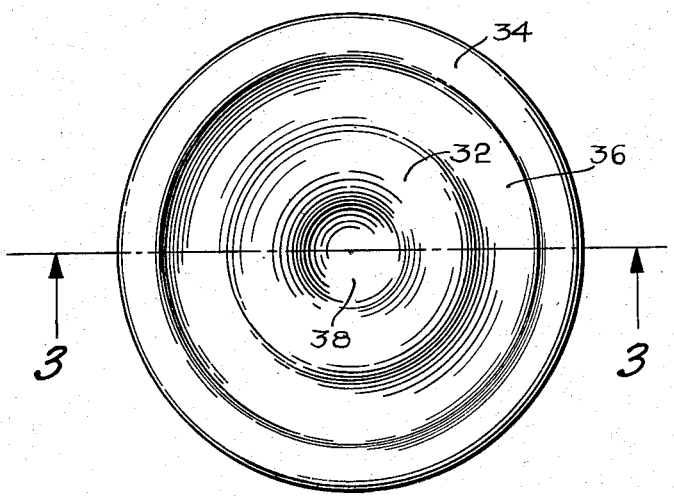
Figure 2 is a top plan view of a modification.
Figure 3:
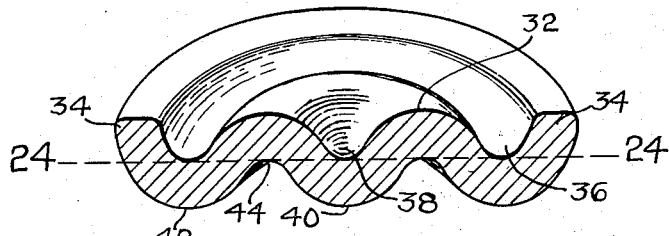
Figure 3 is a cross sectional view taken substantially on the line 3—3 of Figure 2.

In the modification disclosed in Figures 2 and 3, instead of parallel ribs extending across the cake, as shown in the preferred embodiment, the ribs are circular or annular. On the top there is an annular rib 32 and an annular flange 34 on opposite sides of a groove 36. The rib 32 surrounds an annular recess or cavity 38. An annular projection or bump 40 is found in the center underneath the cake. The annular projection 40 cooperates with an annular rib 42 to form a groove 44. The number of ribs and grooves on the top and bottom of this round cake of soap is a matter of choice. In this modification, as well as in the preferred embodiment, a rib on one side is always located opposite a recess or groove on the opposite side. The bottoms of the recesses or grooves on either side are found in a neutral plane indicated by line 24—24, so that as the ribs wear, they will continue to exist until the cake is spent. Due to the annular formation, the grooves or cavities function under proper conditions as vacuum cups or suction cups, which are very beneficial when cooperating with the ribs to violently agitate the surface to be cleaned. In this modification, as well as in the preferred embodiment, the depth or the thickness of the cake is substantially uniform throughout. The ribs could be placed opposite ribs on the opposite side, adjacent ribs being held together with a suitable diaphragm or the like.

Figure 4:
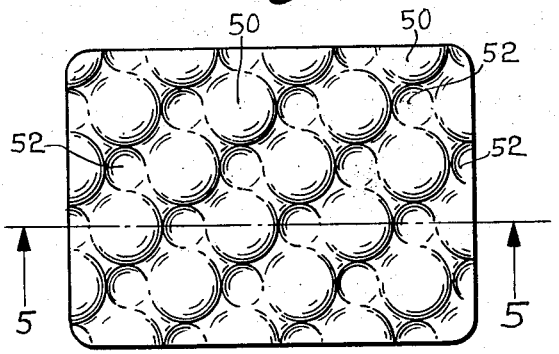
Figure 4 is a top plan view of a modified cake of soap.
Figure 5:
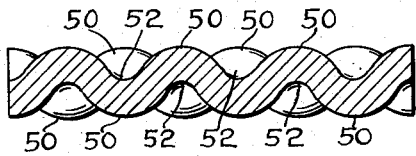
Figure 5 is a sectional view taken substantially on the line 5—5 of Figure 4.

Referring to the modification disclosed in Figure 4, the cake of soap has been provided with bumps or nodes 50 located opposite recesses 52. In this modification the depth of the cake is substantially uniform throughout. Instead of annular bumps or nodes, these may be hexagon, or any other suitable shape.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A corrugated cake of soap having a substantially uniform thickness, the bottoms of the grooves on opposite sides of the cake lying in a neutral plane and flanges between the ridges, said flanges extending from one ridge across to the other so as to reenforce the cake of soap and so as to form suction pockets between the ridges of the soap.

2. A cake of soap having a plurality of nodes on both sides thereof, each of said nodes overlying a completely enclosed depression forming a suction pocket, said depression extending in from the side opposite the node, the depth of the nodes being substantially equal to the depth of the depressions so that the bottoms of the depressions on opposite sides of the cake lie in a common plane.

CHARLTON WALLACE, Jr.